United States Patent
Miyake et al.

(10) Patent No.: US 7,519,356 B2
(45) Date of Patent: Apr. 14, 2009

(54) RELAY APPARATUS AND RELAY METHOD

(75) Inventors: Motoharu Miyake, Yokosuka (JP); Hiroshi Inamura, Yokohama (JP); Takashi Suzuki, Yokosuka (JP); Toshio Miki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 568 days.

(21) Appl. No.: 11/254,807

(22) Filed: Oct. 21, 2005

(65) Prior Publication Data

US 2006/0105738 A1    May 18, 2006

(30) Foreign Application Priority Data

Oct. 22, 2004    (JP) ............... 2004-308770

(51) Int. Cl.
*H04M 3/42*    (2006.01)
(52) U.S. Cl. ............... 455/415; 455/404.1; 455/435.1; 455/412.1
(58) Field of Classification Search ......... 455/404.1, 455/558, 415, 414.1, 412.1–2, 411, 445, 455/9, 11.1, 217, 435.1, 446, 422.1, 557; 379/37
See application file for complete search history.

(56) References Cited

U.S. PATENT DOCUMENTS

| | | | |
|---|---|---|---|
| 2003/0096589 A1* | 5/2003 | Crandall et al. ............. | 455/404 |
| 2003/0169854 A1* | 9/2003 | Yoshitani ............... | 379/90.01 |
| 2004/0052242 A1 | 3/2004 | Laturell | |
| 2006/0120517 A1* | 6/2006 | Moon et al. ............. | 379/45 |
| 2008/0092228 A1* | 4/2008 | Baum ............... | 726/13 |

FOREIGN PATENT DOCUMENTS

| CN | 1487715 A | 4/2004 |
|---|---|---|
| JP | 2003-198757 | 7/2003 |

* cited by examiner

*Primary Examiner*—John J Lee
(74) *Attorney, Agent, or Firm*—Oblon, Spivak, McClelland, Maier & Neustadt, P.C.

(57) ABSTRACT

Plural terminal devices are arranged under a relay apparatus. The relay apparatus includes a mobile communication network connection unit, a packet switching network connection unit, and an emergency call determination unit. The emergency call determination unit determines whether or not the calls originated from the terminal devices are emergency calls, and when the calls are the emergency calls, connects the emergency calls to the mobile communication network connection unit. When the calls are the emergency calls, the mobile communication network connection unit connects the emergency calls to the mobile communication network by issuing thereto a notice on an identification number of the relay apparatus, the identification number being stored in an IC card attached to the relay apparatus.

4 Claims, 3 Drawing Sheets

| CALL ORIGINATION NUMBER | TERMINAL DEVICE IDENTIFICATION NUMBER | CALL ORIGINATION HISTORY |
|---|---|---|
| 090-0001-0000 | 050-0001-0001 | 2004.9.30.12:00 |
| | 050-0001-0002 | |
| | ... | |

RELAY APPARATUS AND RELAY METHOD

CROSS REFERENCE TO RELATED APPLICATIONS

This application is based upon and claims the benefit of priority from prior Japanese Patent Application P2004-308770 filed on Oct. 22, 2004; the entire contents of which are incorporated by reference herein.

BACKGROUND OF THE INVENTION

1. Field of the Invention

The present invention relates to a relay apparatus under which terminal devices are arranged, and to a relay method.

2. Description of the Related Art

Heretofore, in the case of connecting an emergency call from an IP telephone terminal to an emergency report center (such as a police station and a fire department), the emergency call has been outputted to an IP network by inputting a special number to the IP telephone terminal, and the IP telephone terminal and the emergency report center have been connected to each other through the IP network.

Moreover, there has been disclosed an emergency call connection system capable of making a report to an emergency report center corresponding to a position of the IP telephone terminal itself in such a manner that an IP packet which includes a signal requesting the emergency call in response to the input of the special number and includes information on the position of the IP telephone terminal is transmitted to the IP network, the emergency report center corresponding to such positional information is selected, and a call is established with the selected emergency report center (for example, refer to Japanese Patent Laid-Open Publication No. 2003-198757).

However, in Japanese Patent Laid-Open Publication No. 2003-198757 described above, it is assumed that the IP telephone terminal directly connects to the IP network, and it is premised that the IP telephone terminal has a function to connect to the network concerned. Therefore, in the conventional technology, it has been difficult to connect, to the emergency report center, the emergency call requested from a terminal device which does not have the function to connect to the network, such as an extension connecting to an access point in a business office.

In this connection, in consideration of the above-described problem, it is an object of the present invention to provide a relay apparatus and a relay method, which are capable of appropriately connecting the emergency call requested from the terminal device to the network even if the terminal device does not have the function to connect to the network.

SUMMARY OF THE INVENTION

A first aspect of the present invention is to provide a relay apparatus under which plural terminal devices are arranged, including: (A) a mobile communication network connection unit which connects, to a mobile communication network, calls originated from the terminal devices; (B) a packet switching network connection unit which connects, to a packet switching network, the calls originated from the terminal devices; and (C) an emergency call determination unit which determines whether or not the calls originated from the terminal devices are emergency calls, and when the calls are the emergency calls, connects the emergency calls to the mobile communication network connection unit, (D) wherein, when the calls are the emergency calls, the mobile communication network connection unit connects the emergency calls to the mobile communication network by issuing thereto a notice on an identification number of the relay apparatus, the identification number being stored in an IC card attached to the relay apparatus.

A second aspect of the present invention is to provide a relay method of connecting calls originated from plural terminal devices arranged under a relay apparatus to a mobile communication network or a packet switching network, including: (A) determining whether or not the calls originated from the terminal devices are emergency calls, and when the calls are the emergency calls, connecting the emergency calls to the mobile communication network by issuing a notice on an identification number of the relay apparatus, the identification number being stored in an IC card attached to the relay apparatus.

DETAILED DESCRIPTION OF THE INVENTION

Figure 1:
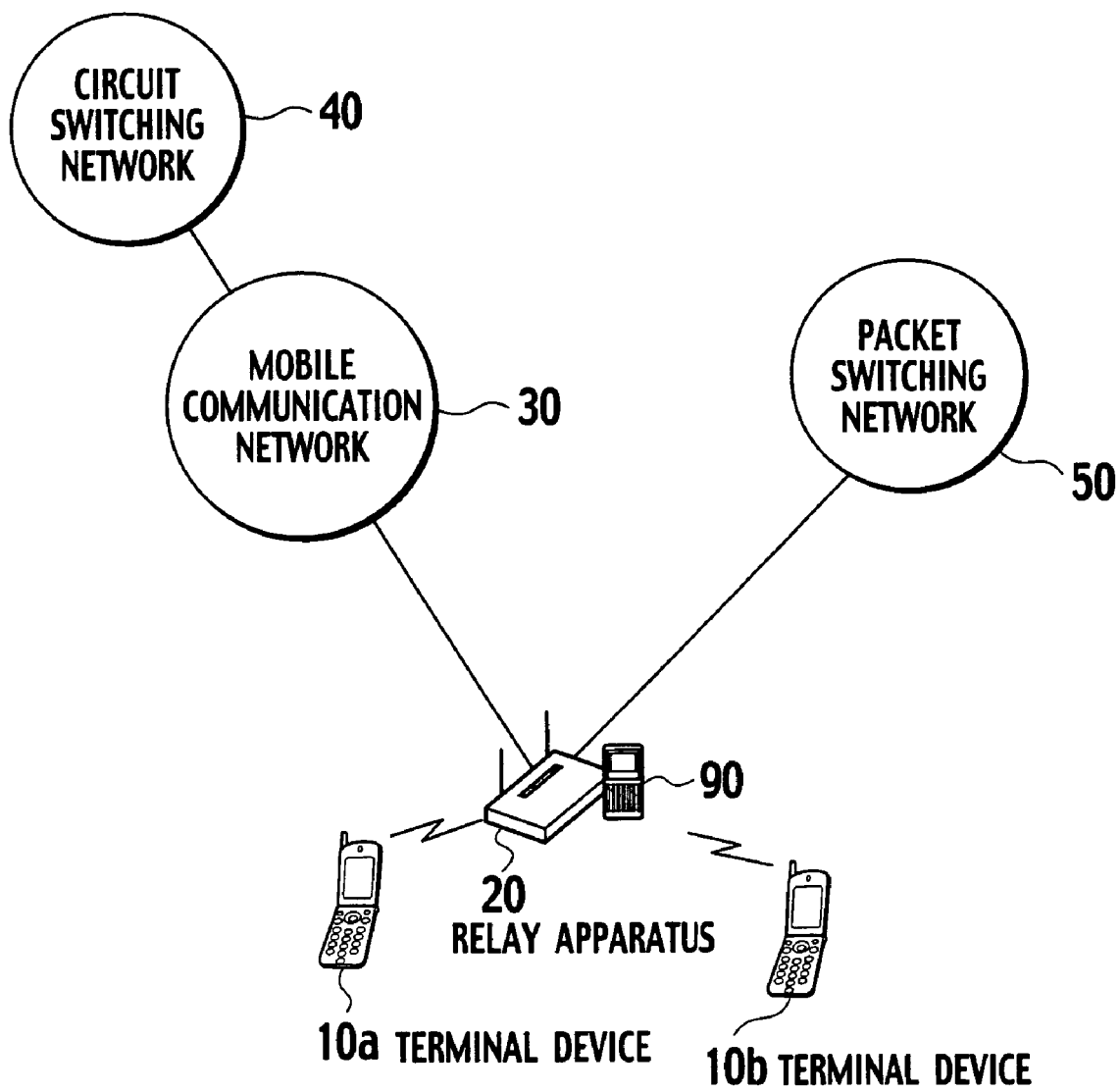
FIG. 1 is a configuration block diagram of a relay system according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In this embodiment, a description will be made of a case where, when an emergency call is originated from a terminal device controlled under a relay apparatus, the relay apparatus determines that the call is the emergency call, and connects the emergency call to an emergency report center through a mobile communication network. Moreover, upon receiving a callback from the emergency report center, the relay apparatus connects the callback to the terminal device which has originated the emergency call. Furthermore, when the relay apparatus cannot connect such a call (callback) originated from the emergency report center to the terminal device which has originated the emergency call, the relay apparatus connects the call originated from the emergency report center to all the other terminal devices controlled under the relay apparatus concerned.

(Relay Apparatus)

As shown in FIG. 1, a relay system according to this embodiment includes plural terminal devices 10a and 10b, a relay apparatus 20, a mobile communication network 30, a circuit switching network 40, and a packet switching network 50. Note that, though FIG. 1 shows that two terminal devices 10a and 10b are present under the relay apparatus 20, it is a matter of course that three or more terminal devices may be present.

The terminal devices 10a and 10b are mobile equipments, and each thereof has a wireless LAN function. The terminal devices 10a and 10b wirelessly connect to the relay apparatus 20.

The relay apparatus 20 arranges the plural terminal devices 10a and 10b thereunder, and connect these terminal devices 10a and 10b to the mobile communication network 30 or the packet switching network 50. Note that the relay apparatus 20 functions as an access point in a business office.

Moreover, an IC card 90 is attached to the relay apparatus 20. In this embodiment, a user identity module (UIM) for use in a third-generation cellular phone is used as the IC card 90. Note that the UIM is also called a universal subscriber identity module (USIM) in some cases since the UIM is based on an SIM for use in a GSM. Moreover, the UIM is also referred to as a removable UIM (R-UIM) in some cases since a shape of the UIM allows the UIM to be detached from a body of the relay apparatus 20. By using this IC card while being exchanged from the other, a telephone number and charge information can be used while being taken over as they are to the other telephone of a different system even if the telephone is exchanged to the other telephone concerned. Note that the IC card (SIM card) 90 stores a client certificate required for a client authentication. Moreover, though the IC card 90 is attached to the relay apparatus 20 in FIG. 1, a cellular phone having a function of the UIM may also be connected thereto through a USB cable.

For example, the FOMA (registered trademark) network and the like are mentioned as the mobile communication network 30, and the mobile communication network 30 connects to the circuit switching network 40 through a gateway apparatus (not shown). The emergency report center is connected to the circuit switching network 40. When the emergency calls are originated from the terminal devices 10a and 10b, the relay apparatus 20 connects the originated calls to the mobile communication network 30.

For example, the Internet and the like are mentioned as the packet switching network 50. Since it is difficult to connect the emergency report center to the packet switching network 50 under the present circumstances, the emergency calls from the terminal devices 10a and 10b are connected to the mobile communication network 30.

Next, details of the relay apparatus 20 will be described by using FIG. 2.

Figures 2, 3:
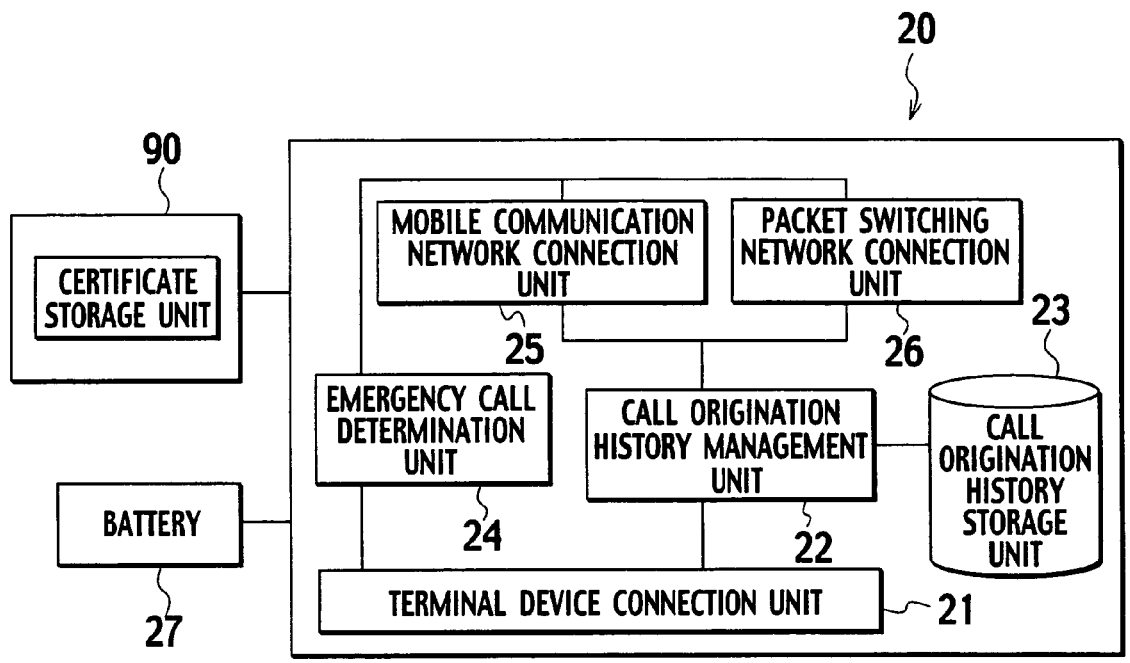
FIG. 2 is a configuration block diagram of a relay apparatus according to the embodiment of the present invention.
FIG. 3 is an example of a file stored by a call origination history storage unit according to the embodiment of the present invention.

As shown in FIG. 2, the relay apparatus 20 according to this embodiment includes terminal device connection unit 21, call origination history management unit 22, a call origination history storage unit 23, emergency call determination unit 24, mobile communication network connection unit 25, packet switching network connection unit 26, and a battery 27.

The terminal device connection unit 21 receives the calls originated from the terminal devices 10a and 10b, and issues a notice on the originated calls thus received to the call origination history management unit 22 and the emergency call determination unit 24. Moreover, the terminal device connection unit 21 connects the call originated from the emergency report center to the terminal device (for example, the terminal device 10a) specified by the call origination history management unit 22 to be described later. Furthermore, when the terminal device connection unit 21 cannot connect the call, which is originated from the emergency report center, to the terminal device (for example, the terminal device 10a) specified by the call origination history management unit 22, the terminal device connection unit 21 connects the call originated from the emergency report center to all the other terminal devices (for example, the terminal device 10b) controlled thereunder.

The call origination history management unit 22 associates a call origination history of the terminal device and an identification number of the terminal device with each other upon receiving the notice from the terminal device connection unit 21, and stores the call origination history and the identification number, which have been associated with each other, in the call origination history storage unit 23 to be described later. Moreover, the call origination history management unit 22 specifies the terminal device which has originated the call to the emergency report center by referring to the call origination history stored in the call origination history storage unit 23 for the call originated from the emergency report center as a connection destination of the emergency call.

As shown in FIG. 3, the call origination history storage unit 23 stores the call origination history of the terminal device and the identification number of the terminal device in association with each other. Here, the call origination history refers to a time when the call was originated from the terminal device. Moreover, IP addresses, MAC addresses, and the like are mentioned as the identification numbers besides telephone numbers shown in FIG. 3. Each identification number just needs to be a number intrinsic to the terminal device. Moreover, when the terminal device is a terminal which does not have its own number for connecting to an external network, such as a so-called extension, the call origination history storage unit 23 may store an extension number as the identification number.

Moreover, the relay apparatus 20 has a call origination number specified by the IC card 90, and the call originated from each terminal device is converted into the call origination number stored by the relay apparatus 20, and is connected to the mobile communication network 30. Note that, for the call origination history storage unit 23, an internal memory device such as a RAM may be used, or an external memory device such as a hard disk and a flexible disk may be used.

The emergency call determination unit 24 determines whether or not the call originated from each of the terminal devices 10a and 10b is the emergency call, and connects the emergency call to the mobile communication network connection unit 25 when the originated call is the emergency call.

The mobile communication network connection unit 25 connects, to the mobile communication network 30, the call originated from each terminal device. In this case, when the call originated from the terminal device is the emergency call, the mobile communication network connection unit 25 converts the call thus originated into the identification number (for example, a call origination number: 090-0001-0000, shown in FIG. 3) of the relay apparatus concerned, which is stored in the IC card 90 attached to the relay apparatus 20, and issues a notice on the identification number to the mobile communication network 30, thereby connecting to the mobile communication network 30. Moreover, the mobile communication network connection unit 25 receives an originated call passing through the mobile communication network 30, and issues a notice on the originated call thus received to the call origination history management unit 22.

Moreover, when the mobile communication network connection unit 25 can issue a notice on two or more identification numbers to a call receiver such as the emergency report center, the mobile communication network connection unit 25 may connect to the mobile communication network 30 by using the identification numbers (for example, a terminal device identification number: 050-0001-0001, shown in FIG. 3) of the terminal devices 10a and 10b together with an identification number of the relay apparatus 20. In this case, when the callback is made from the call receiver which has received the notice on the two or more identification numbers, the call receiver selects one from the two or more identification numbers, and makes the callback to the terminal device having the selected identification number.

The packet switching network connection unit 26 connects, to the packet switching network 50, the call originated from each terminal device. In this case, the call originated from the terminal device is connected to the packet switching network 50 while the identification number (for example, the terminal device identification number: 050-0001-0001, shown in FIG. 3) of the terminal device is being kept as it is. Moreover, the packet switching network connection unit 26 receives an originated call passing through the packet switching network 50, and issues a notice on the originated call thus received to the call origination history management unit 22.

Moreover, when the packet switching network connection unit 26 can issue a notice on two or more identification numbers to the call receiver as in the mobile communication network connection unit 25, the packet switching network connection unit 26 may connect, to the packet switching network 50, the call originated from the terminal device by using the identification numbers of the relay apparatus 20 and the terminal devices 10a and 10b. In this case, when the callback is made from the call receiver which has received the notice on the two or more identification numbers, the call receiver selects one from the two or more identification numbers, and makes the callback to the terminal device having the selected identification number.

Moreover, the relay apparatus 20 includes the battery 27, and thus can operate even when power feed from a network side such as the packet switching network 50 side or an AC power supply cannot be expected.

Moreover, it is possible to update a file, which is managed by the relay apparatus 20, through the mobile communication network 30 and the packet switching network 50. The file managed by the relay apparatus 20 includes, for example, a file (algorithm) describing a program to operate the relay apparatus 20 and the like besides a file as shown in FIG. 3, which is stored by the call origination history storage unit 23.

Moreover, the relay apparatus 20 according to this embodiment can include a central processing unit (CPU), and can adopt a configuration to form the above-described call origination history management unit 22 and emergency call determination unit 24 into modules, and to incorporate the modules in the CPU. These modules can be realized by executing a dedicated program for utilizing a predetermined program language in a general-purpose computer such as a personal computer.

Moreover, though not shown, the relay apparatus 20 may include a program storage unit which stores a program for causing the CPU to execute call origination history management processing, emergency call determination processing, and the like. The program storage unit is a recording medium such as a RAM, a ROM, a hard disk, a flexible disk, a compact disc, an IC chip, and a cassette tape. According to the recording medium as described above, the storage, transportation, sale, and the like of the program can be performed easily.

(Relay Method)

Figure 4:
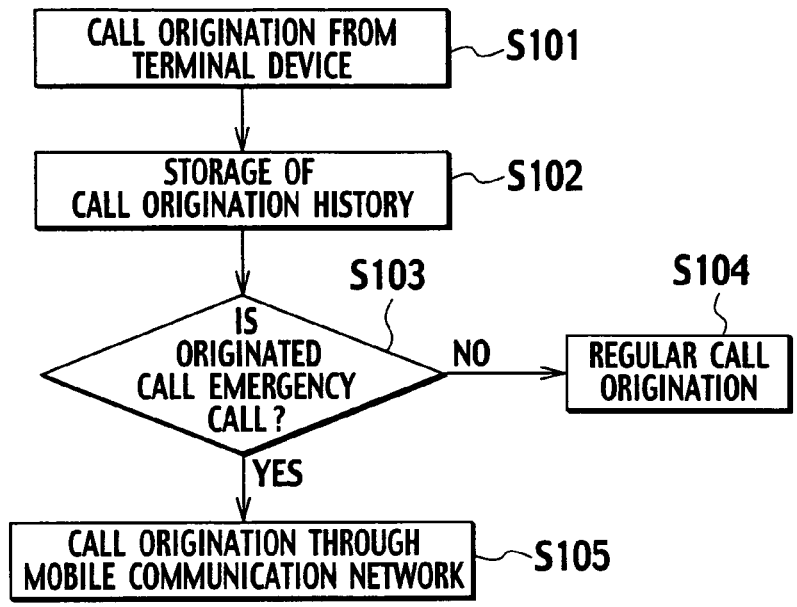
FIG. 4 is a flowchart showing a relay method according to the embodiment of the present invention (No. 1).

Next, a relay method of connecting, to the network, the call originated from the terminal device according to this embodiment will be described by using FIG. 4.

First, in Step S101, the terminal device connection unit 21 receives the call originated from each of the terminal devices 10a and 10b, and issues the notice on the originated call thus received to the call origination history management unit 22 and the emergency call determination unit 24.

Next, in Step S102, the call origination history management unit 22 associates the call origination history of the terminal device and the identification number of the terminal device with each other upon receiving the notice from the terminal device connection unit 21, and stores the call origination history and the identification number, which have been thus associated with each other, in the call origination history storage unit 23.

Next, in Step S103, the emergency call determination unit 24 determines whether or not the call originated from each of the terminal devices 10a and 10b is the emergency call. When the originated call is not the emergency call, the method proceeds to Step S104. When the originated call is the emergency call, the method proceeds to Step S105.

Next, in Step S104, the relay apparatus 20 performs a regular call origination. Specifically, when data received from each of the terminal devices 10a and 10b is packet data, the packet switching network connection unit 26 connects the packet data to the packet switching network 50, and when the data is voice data, the mobile communication network connection unit 25 connects the voice data to the mobile communication network 30.

Meanwhile, in Step S105, the mobile communication network connection unit 25 connects, to the mobile communication network 30, the call originated from the terminal device. Then, the call originated from the terminal device is connected to the circuit switching network 40 through the mobile communication network 30, and the communication with the emergency report center is established. In this case, the mobile communication network connection unit 25 may make the connection to the emergency report center by issuing the notice on the identification number (for example, the call origination number: 090-0001-0000, shown in FIG. 3) of the relay apparatus 20, which is stored in the IC card 90 attached to the relay apparatus concerned. When the mobile communication network connection unit 25 can issue the notice on two or more identification numbers, the mobile communication network connection unit 25 may make the connection by issuing the notice on the identification numbers (for example, the terminal identification number: 050-0001-0001, shown in FIG. 3) of the terminal devices 10a and 10b together with the identification number of the relay apparatus 20.

Figure 5:
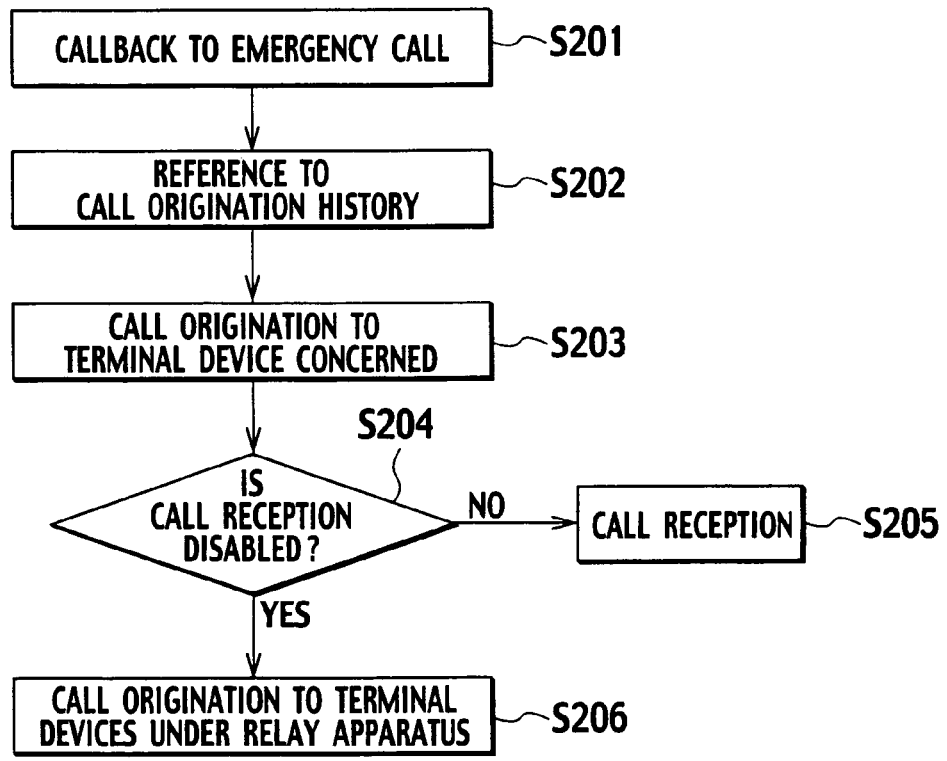
FIG. 5 is a flowchart showing a relay method according to the embodiment of the present invention (No. 2).

Next, a relay method (the so-called callback) for connecting, to the terminal device, the call originated from the emergency report center according to this embodiment will be described by using FIG. 5.

First, in Step S201, the callback is made from the emergency report center to the terminal device which has originated the emergency call to the emergency report center. In this case, the emergency report center originates the call to the identification number (for example, the call origination number: 090-0001-0000, shown in FIG. 3) of the relay apparatus 20. The mobile communication network connection unit 25 receives the originated call passing through the mobile communication network 30, and issues the notice on the originated call thus received to the call origination history management unit 22.

Next, in Step S202, the call origination history management unit 22 specifies the terminal device which has originated the call to the emergency report center by referring to the call origination history stored in the call origination history storage unit 23 for the call originated from the emergency report center as the connection destination of the emergency call. Specifically, the call origination history management unit 22 specifies the terminal device corresponding to the up-to-date call origination history. Here, the call origination history shown in FIG. 3 is taken as an example, and it is assumed that the call origination history management unit 22 has specified the terminal device 10a having the up-to-date call origination history.

Next, in Step S203, the terminal device connection unit 21 connects, to the terminal device 10a specified by the call origination history management unit 22, the call originated from the emergency report center. In this case, the terminal device connection unit 21 converts the identification number (for example, the call origination number: 090-0001-0000, shown in FIG. 3) of the relay apparatus 20 into the identification number (for example, the terminal device identification number: 050-0001-0001, shown in FIG. 3) of the terminal device, and originates the call.

Next, in Step S204, when the terminal device connection unit 21 cannot connect the originated call to the terminal device 10a, the method proceeds to Step S206. When the terminal device connection unit 21 has been able to connect the originated call to the terminal device 10a, the terminal device 10a receives the call originated from the emergency report center in Step S205.

In Step S206, the terminal device connection unit 21 connects, to all the other terminal devices (for example, the terminal device 10b) controlled under the relay apparatus 20, the call originated from the emergency report center.

Moreover, it has been described that the emergency report center originates the call to the call origination number (for example, 090-0001-0000 shown in FIG. 3) of the relay apparatus 20 in Step S201; however, when the emergency report center receives the notice on the identification numbers of the relay apparatus 20 and the terminal devices 10a and 10b, the emergency report center selects either of the identification numbers, and originates the call to the relay apparatus 20.

(Function and Effect)

In accordance with the relay apparatus 20 and the relay method according to this embodiment, it can be determined whether or not the calls originated from the terminal devices 10a and 10b are the emergency calls, and when the originated calls are the emergency calls, the originated calls can be connected to the mobile communication network 30. Therefore, the emergency calls requested from the plural terminal devices controlled under the relay apparatus 20 can be appropriately connected to the emergency report center.

In this case, each of the terminal devices 10a and 10b themselves does not have to have a function to connect to the external network. For example, even if the emergency call is originated from a terminal device connected to an in-house LAN or from a stationary telephone to be used as an extension, the emergency call can be connected to an appropriate network in accordance with the relay apparatus 20 and the relay method according to this embodiment.

Moreover, the relay apparatus 20 and the relay method according to this embodiment can specify the terminal device which has originated the call to the emergency report center by referring to the call origination history, and can make the callback from the emergency report center to the terminal device. In the case of emergency, it is sometimes necessary to make the callback. However, heretofore, it has been possible for the emergency report center to recognize no more than the call origination number (for example, 090-0001-0000 shown in FIG. 3) of the relay apparatus 20, and it has been difficult t specify the terminal device which has originated the emergency call. In accordance with the relay apparatus 20 and the relay method according to this embodiment, since the call origination history is stored, it is possible to specify the terminal device which has originated the emergency call, and to cope with the callback in the case of emergency.

Furthermore, in the case of the above-described callback, it is sometimes impossible to connect the callback to the specified terminal device since the specified terminal device is out of communication range, is not in operation, and so on. In this case, in accordance with the relay apparatus 20 and the relay method according to this embodiment, the call originated from the emergency report center can be connected to all the other terminal devices controlled under the relay apparatus 20. As described above, the callback is broadcasted to all the terminal devices present in the vicinity of the terminal device which has originated the emergency call, thus making it possible to rapidly cope with the case of emergency.

Moreover, the mobile communication network connection unit 25 and the packet switching network connection unit 26 can make the connection to the mobile communication network 30 or the packet communication network 50 by the identification number of the relay apparatus and the identification numbers of the terminal devices, and can issue the notice on two identification numbers to the call receiver. Moreover, when the callback is made from the call receiver, one identification number can be selected from the two identification numbers, and the connection can be made to the device to the terminal device having the selected identification number.

Other Embodiments

Although the present invention has been described by the embodiment described above, it should not be understood that the description and the drawings, which form a part of this disclosure, limits this invention. From this disclosure, various alternative embodiments, examples, and operation technologies will be obvious to those skilled in the art.

For example, though it has been described in this embodiment that the terminal devices 10a and 10b are the mobile equipments each having the wireless LAN function, the terminal devices 10a and 10b may be stationary telephones connected to the relay apparatus 20 by wire. Moreover, the terminal devices 10a and 10b may be terminal devices which do not have their own numbers for connecting to the external network, such as the so-called extensions.

Moreover, though it has been described in this embodiment that, when the relay apparatus 20 receives the calls originated from the terminal devices 10a and 10b, the relay apparatus 20 stores the call origination history in the call origination history storage unit 23, the relay apparatus 20 may also store the call origination history only when the emergency calls are originated from the terminal devices 10a and 10b.

Furthermore, though the description has bee made in FIG. 3 that the relay apparatus 20 converts the calls originated from the terminal devices 10a and 10b into one call origination number, the relay apparatus 20 may also have two or more call origination numbers. This can be realized by attaching two or more IC cards 90 to the relay apparatus 20.

Furthermore, it has been described in this embodiment that the emergency report center is connected to the circuit switching network 40; however, also when the emergency report center is connected to the packet switching network 50, the callback from the emergency report center can be connected to the terminal device in a similar procedure to the case where the emergency report center is connected to the circuit switching network 40.

As described above, it is a matter of course that the present invention incorporates the various embodiments and the like, which are not described herein. Hence, the technical scope of the present invention is defined only by items specifying the invention, which are according to the scope of claims reasonable from the above description.

What is claimed is:

1. A relay apparatus under which plural terminal devices are arranged, comprising:

a mobile communication network connection unit which connects, to a mobile communication network, calls originated from the terminal devices;

a packet switching network connection unit which connects, to a packet switching network, the calls originated from the terminal devices;

an emergency call determination unit which determines whether or not the calls originated from the terminal devices are emergency calls, and when the calls are the emergency calls, connects the emergency calls to the mobile communication network connection unit;

a call origination history storage unit which stores a call origination history of the terminal devices and identification numbers of the terminal devices in association with each other;

a call origination history management unit which specifies the terminal device which has originated the call to an emergency report center by referring to the call origination history for a call from the emergency report center as a connection destination of the emergency calls; and a terminal device connection unit which connects, to the terminal device specified by the call origination history management unit, the call originated from the emergency report center, wherein when the calls are the emergency calls, the mobile communication network connection unit connects the emergency calls to the mobile communication network by transmitting an identification number of the relay apparatus to the mobile communication network, the identification number being stored in an IC card attached to the relay apparatus.

2. The relay apparatus according to claim 1, wherein, when the terminal device connection unit cannot connect the call, which has been originated from the emergency report center, to the terminal device specified by the call origination history management unit, the terminal device connection unit connects, to all the other terminal devices controlled under the relay apparatus, the call originated from the emergency report center.

3. The relay apparatus according to claim 1, wherein the mobile communication network connection unit issues a notice on identification numbers of the terminal devices together with identification number of the relay apparatus.

4. A relay method of connecting calls originated from plural terminal devices arranged under a relay apparatus to a mobile communication network or a packet switching network, comprising:

determining whether or not a call originated from the terminal devices is an emergency call;

connecting the emergency call to the mobile communication network by transmitting an identification number of the relay apparatus, stored in an IC card attached to the relay apparatus, to the mobile communication network when the call is the emergency call;

storing a call origination history of the terminal devices and identification numbers of the terminal devices in association with each other in a call origination history storage unit;

specifying the terminal device which has originated the emergency call by referring to the call origination history for a call from the emergency report center as a connection destination of the emergency call; and connecting the call originated from the emergency report center to the specified terminal device.

* * * * *